(12) United States Patent
Bichlmeier

(10) Patent No.: US 9,752,871 B2
(45) Date of Patent: Sep. 5, 2017

(54) METHOD FOR DETERMINING THE ORIENTATION OF AT LEAST ONE RAIL AND DEVICE FOR CARRYING OUT THE METHOD

(71) Applicant: Robert Bosch GmbH, Stuttgart (DE)

(72) Inventor: Ulrich Bichlmeier, Muehldorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 320 days.

(21) Appl. No.: 14/394,948

(22) PCT Filed: Mar. 20, 2013

(86) PCT No.: PCT/EP2013/055802
§ 371 (c)(1),
(2) Date: Oct. 16, 2014

(87) PCT Pub. No.: WO2013/156243
PCT Pub. Date: Oct. 24, 2013

(65) Prior Publication Data
US 2015/0085274 A1  Mar. 26, 2015

(30) Foreign Application Priority Data

Apr. 16, 2012  (DE) .................... 10 2012 206 212

(51) Int. Cl.
| | | |
|---|---|---|
| *G01C 3/08* | (2006.01) | |
| *G01B 11/26* | (2006.01) | |
| *G01B 11/275* | (2006.01) | |
| *G01B 21/26* | (2006.01) | |
| *G01B 11/14* | (2006.01) | |

(52) U.S. Cl.
CPC .............. *G01B 11/26* (2013.01); *G01B 11/14* (2013.01); *G01B 11/275* (2013.01); *G01B 21/26* (2013.01); *G01B 2210/12* (2013.01); *G01B 2210/62* (2013.01)

(58) Field of Classification Search
CPC ....... G01B 11/275; G01B 11/14; G01B 11/26; G01B 21/26; G01B 2201/12; G01B 2201/62; G01B 2210/12; G01B 2210/62
USPC .......................................................... 356/5.01
See application file for complete search history.

(56) References Cited

U.S. PATENT DOCUMENTS

| | | | | |
|---|---|---|---|---|
| 5,675,515 A | * | 10/1997 | January ................ | G01B 11/275 356/139.09 |
| 5,724,128 A | | 3/1998 | January | |
| 6,252,973 B1 | * | 6/2001 | January .............. | G01B 11/2755 33/203.18 |

(Continued)

FOREIGN PATENT DOCUMENTS

| | | |
|---|---|---|
| CN | 1429333 | 7/2003 |
| CN | 1923589 | 3/2007 |

*Primary Examiner* — Mark Hellner
(74) *Attorney, Agent, or Firm* — Norton Rose Fulbright US LLP; Gerard Messina

(57) ABSTRACT

A method and a device for determining the orientation of at least one rail of a measuring station of a chassis measuring device or a motor vehicle test line. The device has at least one sensing device, the at least one sensing device has at least one camera and at least one illumination unit. The at least one illumination unit illuminates at least one section of the rail using structured or unstructured light and the at least one camera records the light reflected by the rail.

15 Claims, 2 Drawing Sheets

(56) References Cited

U.S. PATENT DOCUMENTS

| 7,869,018 B2* | 1/2011 | Strege | B66F 7/28 |
| | | | 356/139.09 |
| 2005/0030525 A1 | 2/2005 | Forster et al. | |
| 2006/0126966 A1 | 6/2006 | Strege et al. | |
| 2007/0124949 A1* | 6/2007 | Burns | G01B 11/2509 |
| | | | 33/288 |

* cited by examiner

METHOD FOR DETERMINING THE ORIENTATION OF AT LEAST ONE RAIL AND DEVICE FOR CARRYING OUT THE METHOD

FIELD OF THE INVENTION

The present invention relates to a method for determining the orientation of at least one rail of a measuring station and a device for carrying out the method.

BACKGROUND INFORMATION

A method and a device for a wheel alignment system is known from document US 2006/0126966, which is able to be used for determining the orientation of at least one surface of the hydraulic lift. In this instance, a target's is positioned on the surface to be investigated, the target's picture is recorded with the aid of a camera and the position and orientation of the target are determined.

SUMMARY OF THE INVENTION

As opposed to this, the method according to the present invention and the device according to the present invention having the characterizing features of the independent claims have the advantage that no targets have to be placed on the rails that are to be investigated. A determination of the orientation of the rails, without additional aids, such as targets, is able to be made by the method and the device according to the present invention.

This enables the simple carrying out of the method, since no additional aids have to be fastened or placed on the rails.

The measures of the descriptions herein allow for advantageous developments and improvements of the present invention.

It is advantageous to record structured light, which is projected by at least one illumination unit onto the rail, after reflection at the rail, by at least one camera, since in structured light, clearly defined light points may be easily identified which are able to be used for distance measurement. By the use of structured light, it may be reliably ensured that three light points are available for the determination of the orientation of the rail.

It is particularly useful to utilize a TOF camera (time of flight camera) by which the position of the rail with respect to sensing devices may be detected directly and very accurately. Furthermore, the at least one illumination unit is integrated in the TOF camera, so that an especially compact configuration of the sensing device is enabled.

The use of unstructured light to detect a characteristic texture of the rail is advantageous, since illumination units for generating unstructured light are connected with only low costs.

A further advantage is achieved by the determination of the orientation of the rails with respect to one another, by using at least one sensing device to measure a left rail and at least one further sensing device to measure a right rail, the sensing devices having a reference system by which the orientation of the sensing devices with respect to each other and of the left rail to the right rail is determined.

A further advantage is achieved by at least one alignment sensor in the sensing device, which determines the orientation of the sensing device and the orientation of the rail to the Earth's gravitational field, since the exact orientation of the rails is required for a calculation of toe and camber of the vehicle's wheels will be required.

Advantageously, the positioning of the sensing devices with respect to a vehicle is such that the at least one camera simultaneously views one vehicle wheel and one rail, and the at least one illumination unit illuminates simultaneously one vehicle wheel and one rail, so that simultaneously a wheel alignment and a measurement of the orientation of the rails are able to be carried out. This leads to an accelerated measuring sequence.

A movable support of the at least one illumination unit and/or camera in the sensing device is advantageous, since thereby the at least one illumination unit and/or camera, before the illumination of the rail and the taking of the reflected light, are able to be rotated in such a way that they look in the direction of the rail, whereby a more exact determination of the orientation and/or flatness of the rails is made possible. The illumination units and cameras are thereby specifically able to illuminate and record areas of the rail on which no vehicle wheel is located.

By the examination of the at least one rail with respect to its flatness, possible errors in the wheel alignment may be reliably excluded for determining the toe and/or wheel camber of the vehicle wheels. If it is determined during the measurement that the rails are uneven, measures have to be taken to correct the measured values or the rails have to be realigned.

The measuring of the orientation and/or the flatness is advantageous while a vehicle is located on the rails, since thereby the effect of the weight of the vehicle on the rails can be taken into account. Furthermore, the measurement of the orientation and/or the flatness may be carried out at the same time or shortly before or shortly after the wheel alignment to determine the toe and/or the wheel camber of the vehicle wheels, whereby the overall measuring time is able to be greatly reduced.

Exemplary embodiments of the present invention are depicted in the drawings and explained in greater detail in the description below.

DETAILED DESCRIPTION

Figure 1:
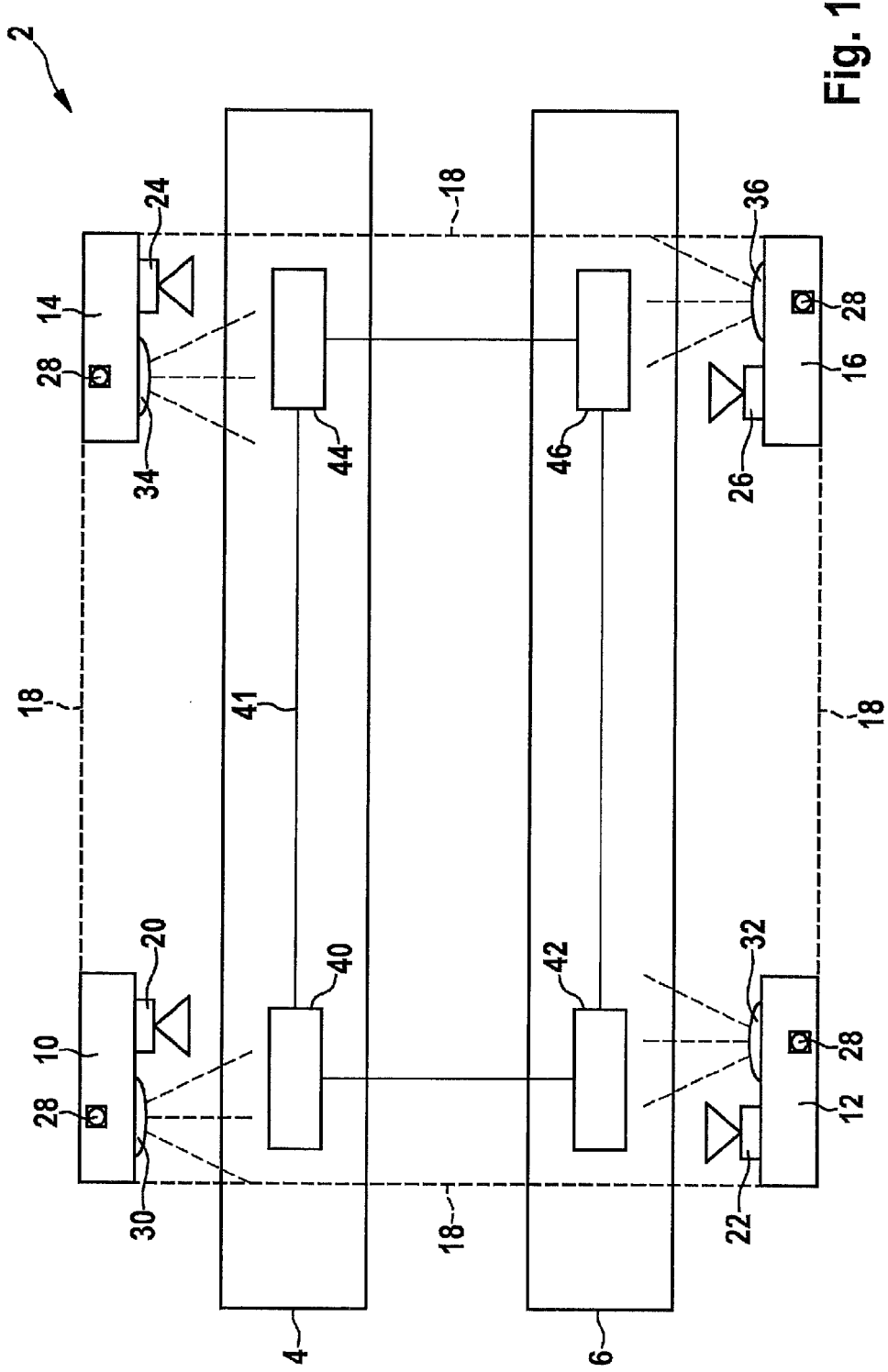
FIG. 1 shows a schematic representation of a measuring station of a chassis measuring device.

FIG. 1 represents a measuring station 2. Measuring station 2 has two elongated rails 4, 6, which are used as tire contact areas of a vehicle 41 that is to be measured.

Four sensing devices 10, 12, 14, 16 are situated on measuring station 2, front right sensing device 10 being used for a front right wheel 40, front left sensing device 12 being used for a front left wheel 42, rear right sensing device 14 being used for a rear right wheel 44 and rear left sensing device 16 being used for a rear left wheel 46. Measuring devices 10, 12, 14, 16 each have at least one camera 20, 22, 24, 26 and each have at least one illumination unit 30, 32, 34, 36.

Measuring devices 10, 12, 14, 16 are positioned in such a way with respect to vehicle 41 that is to be measured that the at least one camera 20, 22, 24, 26 and the at least one illumination unit 30, 32, 34, 36 are each directed at vehicle wheel 40, 42, 44, 46 respectively to be measured. For the wheel alignment, illumination units 30, 32, 34, 36 project structured and/or unstructured light on vehicle wheels 40, 42, 44, 46 of vehicle 41. The reflected light beams of the structured and/or unstructured light are able to be recorded by the at least one camera 20, 22, 24, 26, and are used, with the aid of evaluation routines, for determining toe and camber of vehicle wheels 40, 42, 44, 46 that are to be measured.

Sensing devices 10, 12, 14, and 16 each have at least one alignment sensor 28, by which the orientation of the respective sensing devices 10, 12, 14, 16 is determined with respect to the Earth's gravitational field. The at least one alignment sensor 28 may be an acceleration sensor or an inclination sensor.

Sensing devices 10, 12, 14, 16 may be positioned with respect to vehicle 41 and rail 4, 6 in such a way that at least one camera 20, 22, 24, 26 is able to view vehicle wheel 40, 42, 44, 46 and rail 4, 6 simultaneously, and the at least one illumination unit 30, 32, 34, 36 is able to illuminate a vehicle wheel 40, 42, 44, 46 and a rail 4, 6 simultaneously.

Alternatively or in addition, the at least one camera 20, 22, 24, 26 and/or the at least one illumination unit 30, 32, 34, 36 are able to be supported movably in sensing device 10, 12, 14, 16. Because of that, the at least one camera 20, 22, 24, 26 and/or the at least one illumination unit 30, 32, 34, 36 are able to be rotated before the determination of the orientation and/or the flatness of the rail 4, 6 in such a way that they view in the direction of rail 4, 6. After the determination of the orientation and/or the flatness of rail 4, 6, they may be rotated so that they view in the direction of vehicle wheel 40, 42, 44, 46.

Figure 2:
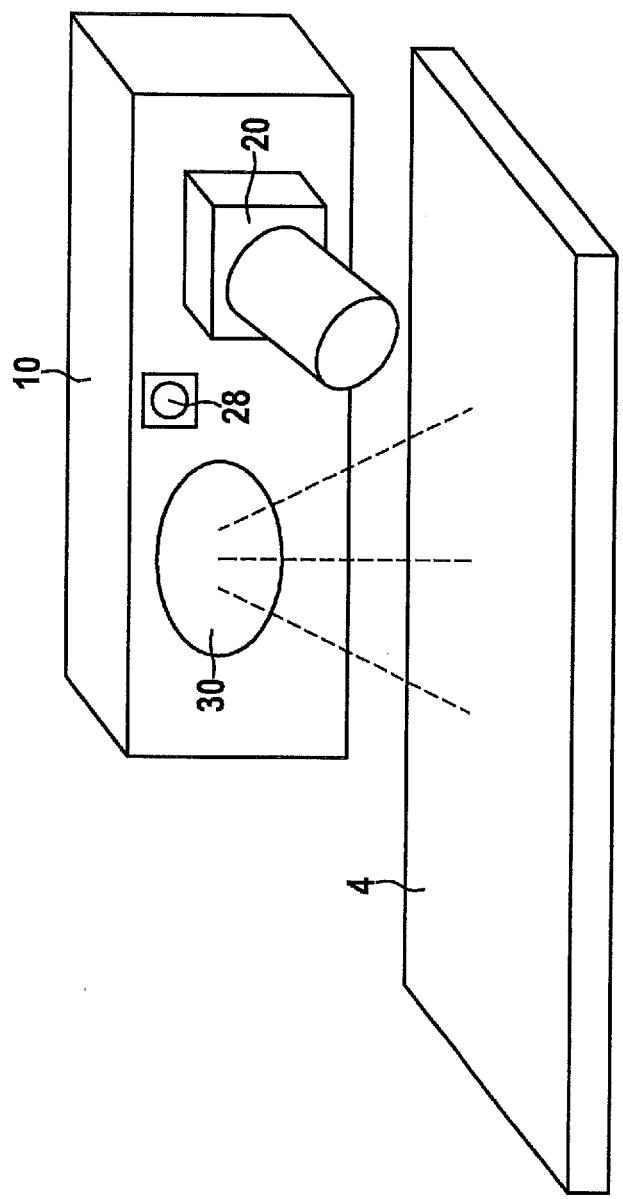
FIG. 2 shows a representation of a sensing device and a rail.

A first exemplary embodiment will be described with the aid of front right sensing device 10 and right rail 4, which are shown in FIG. 2. The subsequent statements may also be applied, however, to the additional sensing devices 12, 14, 16 and left rail 6.

FIG. 2 shows front right sensing device 10, which is used for measuring front right vehicle wheel 40. The at least one illumination unit 30 illuminates at least one section of rail 4 using structured light. The reflected light is recorded by the at least one camera 20 of sensing device 10 and is evaluated in sensing device 10 by an evaluation unit with the aid of evaluation routines.

Because of the illumination using structured light, a dot pattern or a line structure, for example, may be projected on rail 4. The reflected light, in which the structured light pattern is recognizable, is recorded by the at least one camera 20.

In the recordings of the structured light, at least three light points are identified and evaluated for the distance determination between rail 4 and sensing device 10, by subsequent evaluation routines. The at least three light points may be formed, for instance, by intersections of a line structure with the edges of the rail. Alternatively, an already structured point pattern may be projected on rail 4, from which at least three light points are identified for the subsequent evaluation routines. If the pattern of the structured light is known to sensing device 10, one camera 20 is needed. In the case of an unknown pattern of the structured light, at least two cameras 20 are needed.

The distance determination is carried out using known evaluation methods which, using methods of triangulation, carry out a distance calculation from the at least one recording of the at least three light points. From the distance calculation of the at least three light points, one is able to calculate the orientation of rail 4 in three-dimensional space, with respect to sensing devices 10.

Because of the determination of the orientation of sensing device 10 with respect to the Earth's gravitational field by alignment sensor 28 and the knowledge of the orientation of rail 4 with respect to sensing devices 10, one is able to determine the orientation of rail 4 to the Earth's gravitational field.

Sensing devices 10, 12, 14, 16 may have a reference system 18, by which the relative position of the individual sensing devices 10, 12, 14, 16 to one another may be determined. The functioning of such a reference system is described, in exemplary fashion, in European document EP 1 184 640.

The orientation of left rail 4 with respect to right rail 6 is able to be determined by reference system 18. For this purpose, the orientation of right rail 4 with respect to sensing device 10 is determined and the orientation of left rail 6 is determined with respect to sensing device 12. Furthermore, because of reference system 18, the position of the two sensing devices 10, 12 to each other is determined, so that, from this, the position of left rail 6 to right rail 4 is able to be determined. If an alignment sensor 28 is included in each of the two sensing devices 10, 12, the position of left rail 6 and right rail 4 with respect to each other and to the Earth's gravitational field is able to be determined.

The accuracy of the method may be increased by using more than one sensing device 10, 12, 14, 16 for determining the orientation of a rail 4, 6. The orientation of the right rail 4 may be determined respectively by right front sensing device 10 and right rear sensing device 14. Because of reference system 18, the position of right front sensing device 10 with respect to right rear sensing device 14 is known. The orientation of right rail 4 determined by right front sensing device 10 and the orientation of right rail 4 determined by right rear sensing device 14 may be averaged or may be used to verify the individual results.

An analogous method for determining the orientation of left rail 6 is made possible by using left front sensing device 12 and left rear sensing device 16.

Besides determining the orientation of rails 4, 6, the method according to the present invention is also used to determine the flatness of rails 4, 6. For this purpose, in analogy to the method described so far, one may proceed to the orientation of rails 4, 6.

Instead of three light points, which are sufficient for the determination of the orientation of rails 4, 6, in the method for determining the flatness of rails 4, 6, at least four light points are required. The at least four light points are gained from the recordings, by the at least one camera 20, of the structured light reflected by the rails.

A distance determination is carried out using known evaluation methods which, using methods of triangulation, carry out a distance calculation from the at least one recording of the at least four light points. From the distance calculation of the at least four light points, one may form a judgment of the flatness of rails 4, 6. If the at least four light points are located in one plane, the flatness of rail 4 is fulfilled. If the at least four light points are not located in one plane, the flatness of rail 4.6 is not fulfilled. For the determination of the flatness, if more than four light points are evaluated, the accuracy of the method is able to be increased.

In a second exemplary embodiment, the at least one TOF camera 20 (time of flight camera) is located in sensing device 10. Camera 20 is configured as TOF camera 20, and is able to measure distances using a transit time method. For this, at least one section of rail 4 is illuminated using a light pulse, and TOF camera 20, for each image point, measures the time the light requires to get to rail 4 and back again. The time required is directly proportional to the distance. Consequently, TOF camera 20 supplies for each image point the distance of the object imaged on it. TOF camera 20 supplies a plurality of image points that are at a known distance, so that the orientation and/or the flatness of rail 4 may be determined from this. Illumination unit 30 is integrated into TOF camera 20 in this exemplary embodiment.

In a third exemplary embodiment, rail 4 is not illuminated by structured light but rather, using unstructured light using illumination unit 30. A characteristic texture of rail 4, 6 becomes detectable by the illumination using unstructured light. The reflected light, in which the characteristic texture of rail 4, 6 is detectable, is recorded by at least two cameras 20. In this exemplary embodiment, the characteristic texture is not known to the two cameras 20.

The individual features of the characteristic texture are evaluated with respect to their distance from sensing devices 10, 12, 14, 16. This is carried out using known evaluation methods which, using methods of triangulation, carry out a distance calculation from the recordings of the at least two cameras 20. In the characteristic texture of rail 4, if at least three clearly defined features are identifiable which do not lie on a straight line, the orientation of rail 4 is able to be calculated in three-dimensional space with respect to sensing device 10. In an analogous manner, the flatness of rail 4 may be determined by gathering at least four clearly defined features from the characteristic texture of rail 4.

The second and the third exemplary embodiment may also be broadened to include the additional sensing devices 12, 14, 16 and the associated illumination units 32, 34, 36 and cameras 22, 24, 26 and an optional combination of the components mentioned.

The method according to the present invention for determining the orientation and/or flatness may be carried out without or with vehicle 41 on rails 4, 6. If there is a vehicle 41 on rails 4, 6, only the areas of rails 4, 6 which are not covered by a vehicle wheel 40, 42, 44, 46 are used for the evaluation.

What is claimed is:

1. A method for determining at least one of an orientation and a flatness of at least one rail of a measuring station of a chassis measuring device or a motor vehicle test line, the method comprising:
    illuminating, using at least one illumination unit of at least one sensing device having at least one camera and the at least one illumination unit, at least one section of the at least one rail using at least one of structured and unstructured light;
    recording, using the at least one camera, light reflected by the at least one rail; and
    carrying out a measurement of a distance between the at least one rail and the at least one sensing device based on the recorded reflected light, wherein, by a first sensing device of the at least one sensing device, a first distance between the first sensing device and a first rail of the at least one rail is measured, and, by a second sensing device of the at least one sensing device, a second distance between the second sensing device and a second rail of the at least one rail is measured, and wherein the first and second sensing devices have a reference system, by which the orientation of the first rail to the second rail is determined based on the first and second distances.

2. The method of claim 1, wherein the structured light is projected onto the rail and the at least one camera records the reflected light points, by which the position of the rail is determinable with respect to the sensing device.

3. The method of claim 1, wherein the at least one illumination unit is integrated into the at least one camera, which is configured as a time of flight (TOF) camera, by which the position of the rail is determinable with respect to the at least one sensing device.

4. The method of claim 1, wherein a characteristic texture of the rail is detectable by the unstructured light, so that the position of the rail is determinable with respect to the at least one sensing device.

5. A method for determining at least one of an orientation and a flatness of at least one rail of a measuring station of a chassis measuring device or a motor vehicle test line, the method comprising:
    illuminating, using at least one illumination unit of at least one sensing device having at least one camera and the at least one illumination unit, at least one section of the at least one rail using at least one of structured and unstructured light;
    recording, using the at least one camera, light reflected by the at least one rail;
    carrying out a measurement of a distance between the at least one rail and the at least one sensing device based on the recorded reflected light; and
    determining, using at least one alignment sensor in the at least one sensing device, the orientation of the at least one sensing device and the orientation of the at least one rail with respect to the Earth's gravitational field.

6. The method of claim 1, wherein the sensing devices are positioned with respect to a vehicle, so that that the at least one camera views a vehicle wheel and a rail simultaneously and the at least one illumination unit is directed at a vehicle wheel and a rail simultaneously.

7. The method of claim 1, wherein at least one of the at least one camera and the at least one illumination unit are rotatable before the illumination and the taking of the reflected light so that they view in the direction of the rail.

8. A method for determining a flatness of at least one rail of a measuring station of a chassis measuring device or a motor vehicle test line, the method comprising:
    illuminating, using at least one illumination unit of at least one sensing device having at least one camera and the at least one illumination unit, at least one section of the at least one rail using at least one of structured and unstructured light;
    recording, using the at least one camera, light reflected by the at least one rail;
    carrying out a flatness measurement of the at least one rail based on the recorded reflected light.

9. The method of claim 1, wherein a vehicle is located on the rails.

10. A device for determining at least one of an orientation and a flatness of at least one rail of a measuring station of a chassis measuring device or a motor vehicle test line, the device comprising:
    at least one sensing device having at least one camera and at least one illumination unit;
    wherein the at least one sensing device is positioned with respect to the vehicle and to the at least one rail so that the at least one camera and the at least one illumination unit are directed at both a vehicle wheel and at the at least one rail, and
    wherein the at least one sensing device includes a first sensing device to measure a distance of a first rail of the at least one rail from the first sensing device, and a second sensing device to measure a distance of a second rail of the at least one rail from the second sensing device, the first and second sensing devices having a reference system by which an orientation of the first rail to the second rail is determined.

11. The device of claim 10, wherein at least one of the at least one camera and the at least one illumination unit are supportable movably in sensing device.

12. The device of claim 10, wherein the at least one illumination unit is integrated into at least one camera, which is configured as a time of flight (TOF) camera.

13. The device of claim 10, wherein the at least one illumination unit illuminates at least one section of the rail using at least one of structured and unstructured light, the at least one camera records light reflected by the rail, and the at least one sensing device carries out a measurement of the distance between the rail and the at least one sensing device based on the recorded reflected light.

14. A device for determining at least one of an orientation and a flatness of at least one rail of a measuring station of a chassis measuring device or a motor vehicle test line, the device comprising:

at least one sensing device having at least one camera and at least one illumination unit;
wherein the at least one sensing device is positioned with respect to the vehicle and to the at least one rail so that the at least one camera and the at least one illumination unit are directed at both a vehicle wheel and at the at least one rail, and
wherein the at least one sensing device includes at least one alignment sensor to determine an orientation of the at least one sensing device with respect to the Earth's gravitational field.

15. The method of claim 1, further comprising positioning the at least one sensing device with respect to the vehicle and to the rail so that the at least one camera and the at least one illumination unit are directed simultaneously at both a vehicle wheel and at the rail.

* * * * *